3,082,117
HEAT SEALABLE COATED ORGANIC FILM AND PROCESS
Ralph Charles Schilly, Wilmington, Del., assignor to E. I. du Pont de Nemours and Company, Wilmington, Del., a corporation of Delaware
No Drawing. Filed Oct. 8, 1959, Ser. No. 845,070
11 Claims. (Cl. 117—76)

This invention pertains to coated films, and more particularly, to organic base films such as polyethylene terephthalate film having a continuous coating of a heat-sealable, thermoplastic organic polymeric material.

One of the great advances in the packaging industry in recent years has been the advent of organic base films such as polyethylene terephthalate which possess an unusual combination of properties such as high tensile strength, toughness, high modulus (stiffness), low moisture permeability, high transparency, good flexibility, etc. which particularly suit them for wide application as wrappers in the food, drug and general commodities fields. Many of these films, however, are essentially non-heat sealable because of (1) their high melting point and crystallinity, and/or (2) their tendency to degrade at temperatures required to effect strong heat seals. These films must therefore be provided with coatings of thermoplastic organic polymeric materials such as polyethylene, polypropylene, etc., which do have satisfactory heat seal characteristics. But in general, such coatings when applied to both sides of a base film cause performance problems on conventional automatic packaging machinery due to excessive drag on metal surfaces and/or actual sticking to the heat sealing elements of the packaging machines.

Attempts have been made to use one-side coated films for packaging purposes (leaving an uncoated film surface for machine contact), but only where "fin" type seals (coated side to coated side) were employed could effective heat seals be obtained without detracting from package appearance. It has not been feasible heretofore to seal the coated side of the wrapper to the uncoated surface thereof.

It is the primary object of this invention, therefore, to provide a one-side polymer-coated film capable of producing commercially acceptable heat seals as regards both strength and appearance when the coated side is sealed to the uncoated side of the film.

It is a further object of this invention to provide a one-side polymer-coated organic base film which may be satisfactorily heat sealed on conventional mechanical packaging equipment without sticking to the heated surfaces used for sealing.

A more specific object is to provide a one-side polymer-coated polyethylene terephthalate film capable of producing commercially acceptable seals when the coated side is sealed to the uncoated side of the film. These and other objects will more clearly appear from the description which follows.

The foregoing and related objects are realized by the present invention which, briefly stated, comprises applying to both sides (surfaces) of a non-heat sealable organic base film a continuous coating of a solution of titanium organic compound from the group consisting of hydrolyzable organic titanium esters of the formula $(RO)_4Ti$ wherein R is an alkyl radical containing from 1 to 8 carbon atoms, and the reaction products obtained by reacting 1 to 4 mols of acetylacetone with 1 mol of an alkyl titanate containing from 2 to 4 carbon atoms in the alkyl group, drying the coated film to remove solvent and to cure (harden) the coating thereon, and thereafter applying to one side only of said coated film a continuous coating of a heat sealable composition consisting essentially of a polymer of an alpha-olefin.

By "non-heat sealable organic base film" as used herein is meant any self-supporting organic film which, for all practical purposes, may not be heat sealed by conventional heat sealing apparatus by reason of (1) a high degree of crystallinity (particularly in the case of biaxially stretched film), (2) a high melting point, (3) a tendency to degrade at temperatures necessary to be used for sealing, or (4) whose dimensions are affected materially at temperatures utilized for heat sealing. Typical of such films is the commercially important polyethylene terephthalate film, and the invention will be further described with specific reference to such film as the base film to be treated in accordance with this invention. As additional examples of non-heat sealable organic base films there may be mentioned films of copolyesters of ethylene terephthalate and ethylene isophthalate, polystyrene, polyvinyl chloride, polyvinyl fluoride, regenerated cellulose, etc.

The polymeric coating compositions employed for top coating one side of the film in accordance with the present invention must be readily heat sealable on conventional sealing apparatus, i.e., must soften at a lower temperature than the base film. Particularly outstanding compositions are the polymers, i.e., homopolymers and copolymers, of alpha-olefins such as polyethylene and copolymers of polyethylene, polypropylene, polybutylene, copolymeric mixtures of polypropylene and polybutylene, etc.

The hydrolyzable organic titanium esters useful for purposes of this invention are the tetra alkyl esters of orthotitanic acid, wherein the alkyl radicals contain from 1 to 8 carbon atoms, e.g., tetraisopropyl titanate, tetramethyl titanate, tetraethyl titanate, tetraisobutyl titanate, tetra n-butyl titanate, tetraamyl titanate, etc. These esters may be applied to the film from solution in suitable volatile organic solvents such as hexane, cyclohexane, mineral spirits, benzene, toluene, xylene, methyl alcohol, ethyl alcohol, butanol, etc. These solutions may be modified by the addition of minor amounts of an organic hydrolysis modifying agent (hydrolysis promoters and retarders), such as normally solid hydrocarbons, halogenated hydrocarbons, alcohols and titanium esters of alcohols containing more than 8 carbon atoms per organic radical, certain ethers, polyethers and hydroxy ethers, water and organomiscible amino compounds, and polyhydroxy compounds.

The preferred titanium organic compounds are those compounds, hereinafter referred to as titanium acetyl acetonates, prepared by reacting from 1 to 4 mols of acetyl acetone with one mol of an alkyl titanate containing from 2 to 4 carbon atoms in the alkyl group, e.g., tetraisopropyl titanate. These compounds have the advantage of being applied to the film from aqueous dispersions which from the standpoint of economy and ease of handling is highly desirable.

The concentration of titanium organic compound deposited on each side of the film should range between 0.005–0.1% by weight, based on the total weight of the film, with the preferred range being .01–.05% by weight of titanium organic compound applied to each side of the film.

The following examples of several preferred embodiments will serve to further illustrate the principles and practice of this invention.

EXAMPLES 1–4

Substantially amorphous polyethylene terephthalate, prepared in accordance with the general procedure described in U.S. Patent 2,465,319, issued to Whinfield and Dickson, was extruded in the form of thin films and oriented by stretching the film to substantially the same extent (at least 2.5× in both the longitudinal direction (LD) and transverse direction (TD) and heat set at 200°–220° C.). The oriented heatset films were then treated on both sides with a titanium acetyl acetonate solution by passing the films through conventional coating and drying apparatus normally employed for a two-side coating of base films. The films were threaded around a roll located in a dip tank containing aqueous titanium acetyl acetonate and then between two doctor rolls. Upon being coated, the films were then passed through the conventional coating tower at a speed of 90 feet/minute. The lower section of the coating tower was maintained at 110° C. and the upper section at 125° C. The dip tank contained a 1.5% titanium acetyl acetonate-.075% acetic acid-water solution prepared by adding one mole of tetraisopropyl titanate to two mols of acetylacetone with rapid agitation until no further heat was developed, after which the reaction mixture was cooled to room temperature and dissolved in an equal volume of dilute acetic acid, and finally diluting the solution to the desired concentration by adding the necessary amount of water.

The thus treated films were then melt-coated on one side with a layer of polyethylene. Conventional extrusion coating equipment (such as described in British Patent 688,637, to Du Pont) was employed. The films were coated at 120–200 feet/minute, the adjustment of screw speeds depending on the coating thickness desired. Polyethylene ("Alathon" 16—Du Pont) was extruded at an average melt temperature of 327° C. using a 4″ air gap between the sheeting die and the nip which produced about a 23″ wide coating.

The polyethylene terephthalate films treated on both sides with a titanium adhesion promoter and coated on one side with a layer of polyethylene were tested for (1) certain physical properties such as stress flex, tear resistance, water vapor permeability, and heat seal strength in both the coated (polyethylene) to coated side and coated to uncoated side, and (2) performance on various packaging and bag making equipment. The results of these tests of the pertinent process conditions are listed in Tables I, II and III.

EXAMPLES 5 AND 6

Oriented polyethylene terephthalates films (0.5 mil thick) prepared as described in Examples 1–4, which had been lightly heat-set (85°–100° C.) to produce a heat-shrinkable film were treated on both sides with a titanium acetyl acetonate solution in the manner described in Examples 1–4 with the exception that the films were passed through the coating drying tower at a speed of 50 feet/minute at a temperature of 50° C. As in Examples 1–4, one side of these treated films was coated with a 0.15–0.25 mil layer of polyethylene. The thus prepared films were tested for certain physical properties and package making and bag fabrication equipment performance, the results of which are listed in Tables I, II and III.

EXAMPLES 7 AND 8

Oriented polyethylene terephthalate films (0.5 mil thick) prepared as previously described were coated on one side with a 4 gram per square meter coating of a copolymer comprising 90 parts by weight of vinylidene chloride, 10 parts of acrylonitrile and 1 part of itaconic acid. In a manner identical to that described in Examples 1–4, the one-side copolymeric coated films were treated on both sides with a titanium acetyl acetonate solution, and the side having the copolymeric coating was coated with a 0.25–0.45 mil thick layer of polyethylene. As in Examples 1–4, the treated polyethylene coated films were tested for certain physical properties and performance on package-making and bag fabricating equipment. The test results are listed in Tables I, II and III.

The heat seal strengths, stress-flex values, tear strength, and IPV (initial permeability value) shown in the following tables were determined as follows:

*Heat seal strength (peel)* was measured by cutting a piece of the film to be tested 4″ x 10″ with the grain running in the long direction into two pieces 4″ x 5″. The two pieces were superimposed so that opposite surfaces were in contact. The two pieces of superimposed film were then sealed together at each end at right angles to the grain with a precision sealer. A ⅛″ wide sealing bar heated to a temperature at which the film sample was to be sealed (at 10 pounds per square inch pressure) contacted the ends for 0.5 second. The sealed sheets were then cut in half at right angles to the grain. From the center of the four resulting pieces, 1½″ wide strips parallel to the grain were cut. They were then tested by opening each set of strips at the free ends, placing them in a Suter testing machine and pulling them apart. The heat-seal strength was the highest force in grams required to pull the strips apart.

*Heat seal strength (shear)*.—Two samples of the films to be tested were superimposed on each other and the superimposed films sealed at one end, the seal width being one inch. The thus sealed films were pulled on an Instron electronic tensile tester at an elongation rate of 1,200% per minute at 75° F. The heat seal (shear) strengths were calculated in pounds per 1.0 inch.

*Stress-flex* is a measure of the flexibility and durability of the film. A sample of the film 4″ x 7″ was placed between two rubber-faced clamp 1″ apart. One clamp is stationary, the other slides back and forth by gravity on two rods flexing the film as the whole assembly rotates, until the film sample breaks. The stress-flex value indicates the number of strokes of the moveable clamp until the film sample breaks.

*Tear strength*, given in grams per mil of thickness, is the force required to tear the film and is measured on an Elmendorf tear tester (manufactured by the Albert Instrument Corp., Philadelphia, Pa.). A tear tester consists of a stationary jaw, a moveable jaw mounted on a pendulum which swings on a frictionless bearing, and means for registering the maximum arc through which the pendulum swings. The film sample is placed between the jaws and the pendulum is released. From the point at which the pendulum stops after tearing the film, the tear strength is calculated.

*IPV*.—The test for moisture vapor permeability is fully described in U.S. Patent 2,147,180 in the name of Ubben.

Table I

| Example | Type base film | Percent conc. of titanium acetyl acetonate (based on total weight of film per side) | Polyethylene coating thickness (mils) | Heat seal strengths (peel values in grams/1.5") coated to coated side at— | | | | | Heat seal strengths (peel values in grams/1.5") coated side to uncoated side at— | | |
|---|---|---|---|---|---|---|---|---|---|---|---|
| | | | | 110° C. | 125° C. | 140° C. | 155° C. | 170° C. | 170° C. | 185° C. | 200° C. |
| 1 | Polyethylene terephthalate | 0.0597 | 0.15 | 801 | 1,098 | 1,242 | 1,314 | 1,482 | 175 | 349 | 368 |
| 2 | do | 0.0597 | 0.25 | 1,071 | 1,566 | 1,656 | 1,620 | 1,932 | 180 | 327 | 358 |
| 3 | do | 0.0353 | 0.40 | 1,041 | 1,224 | 1,434 | 1,320 | 1,008 | 198 | 334 | 414 |
| 4 | do | 0.0353 | 0.25 | 780 | 1,194 | 1,224 | 1,146 | 1,305 | 158 | 236 | 393 |
| 5 | Poly. tere. (lightly heat-set, heat-shrinkable) | 0.0503 | 0.25 | | 440 | 880 | 600 | 710 | 700 | 700 | 450 |
| 6 | do | 0.0442 | 0.15 | | 860 | 530 | 720 | 900 | 600 | 400 | 580 |
| 7 | Poly. tere. coated on one side with 4 g./m.² of a 90/10/1 by weight percent VCl₂/AN/IA.[1] | 0.055 | 0.25 | 768 | 924 | 816 | 852 | 828 | 71 | 180 | 293 |
| 8 | do.[1] | 0.055 | 0.40 | 1,422 | 948 | 1,224 | 918 | 696 | 145 | 335 | 248 |
| Control 1 | Poly. tere | 0 | | 0 | 0 | 0 | 0 | 0 | 0 | 0 | 0 |
| Control 2 | Poly. tere. (lightly heat-set, heat-shrinkable) | 0 | | 0 | 0 | 0 | 0 | 0 | 0 | 0 | 0 |
| Control 3 | Poly. tere. treated with titanium acetyl acetonate on one side only | [2] 0.05 | 0.25 | 960 | 1,620 | 1,098 | 1,488 | 1,580 | 0 | 0 | 0 |

[1] Vinylidene chloride/acrylonitrile/itaconic acid. [2] 1 side.

Table II

| Example | Heat seal strengths (shear values in lbs./1.0") coated side to uncoated side at— | | | | | Stress-flex at— | | Tear strength (grams) | | |
|---|---|---|---|---|---|---|---|---|---|---|
| | 140° C. | 155° C. | 170° C. | 185° C. | 200° C. | 22° C. | −18° C. | MD | TD | IPV |
| 1 | 10.7 | 11.0 | 11.6 | 12.3 | 12.2 | 954 | 326 | 8.9 | 9.0 | 131 |
| 2 | 11.2 | 11.3 | 11.6 | 12.2 | 11.8 | 894 | 347 | 8.8 | 12.6 | 131 |
| 3 | 15.8 | 14.4 | 16.8 | 16.8 | 17.8 | 736 | 381 | 9.6 | 14.0 | 100 |
| 4 | 15.3 | 14.1 | 17.1 | 17.8 | 18.2 | 899 | 357 | 9.8 | 15.1 | 95 |
| 5 | 10.2 | 11.1 | 11.5 | 12.9 | 13.6 | 822 | 284 | 9.4 | 11.9 | 54 |
| 6 | 12.8 | 12.2 | 11.9 | 13.7 | 13.3 | 791 | 332 | 10.5 | 14.6 | 49 |
| 7 | | | | | 27.5 | 603 | 420 | 10.8 | | 144 |
| 8 | | | 26.3 | | 26.3 | 705 | 442 | 9.4 | | 173 |
| Control 1 | 0 | 0 | 0 | 0 | 0 | 433 | 259 | 10.2 | 9.8 | 234 |
| Control 2 | 0 | 0 | 0 | 0 | 0 | 491 | 276 | 11.7 | | 300 |
| Control 3 | 0 | 0 | 0 | 0 | 0 | | | | | |

Table III

| Example | Package making and bag fabricating equipment, performance | | |
|---|---|---|---|
| | Overwrap [1] | Make and fill [2] bag machine | Fabricated [3] bags |
| 1 | Good | Excellent | Good. |
| 2 | do | do | Do. |
| 3 | Excellent | do | Excellent. |
| 4 | do | do | Do. |
| 5 | Good | Good | Good. |
| 6 | do | do | Do. |
| 7 | do | do | Do. |
| 8 | do | do | Do. |

[1] (1) Package FA, overwrap machine, Packaging Machinery Co., East Longmeadow, Mass. (2) Hayssen Wrapper, Hayssen Mfg. Co., Sheboygan, Wis.
[2] (1) Hayssen Compak, make and fill equipment, Hayssen Mfg. Co., Sheboygan, Wis. (2) Pak-Rapid, make and fill equipment, Pak-Rapid Inc., West Conshohocken, Pa.
[3] Simplex, crimp seal fabricated bag machinery, Simplex Packaging Machinery Inc., Oakland, Calif.

From the foregoing tabulations it can be seen that the one-side polyethylene coated films prepared as described in Examples 1–8 possess the physical characteristics necessary for use as packaging and bag manufacturing materials. Better than adequate heat seals were obtained at temperatures normally employed for heat sealing when the uncoated side is sealed to the coated side. The stress-flex and tear resistance are equal or greater than that of the base film. The water vapor permeability, a particularly important factor in such film uses as meat wrapping, etc., was substantially lowered over that of the base film. The coated films of Examples 1–8, when tested on various package making and bag fabricating equipment, show to excellent advantage. The films prepared in accordance with the present invention are particularly applicable to the type of package and bag fabricating equipment wherein the uncoated side forms the outside of the bag, pouch, or overwrap, such that the uncoated side comes in contact with the sealing mechanism, thereby insuring excellent machine runability. These films lend themselves ideally to a wide variety of seal types, such as lap, bottom and top crimp, fin, and side seam. Production of gusseted bags of one-side coated films wherein the outside portion of the gusset (uncoated side to uncoated side) must be held together, may also be satisfactorily realized on converter type equipment employing adhesives and heat, e.g., "Simplex" 400—Simplex Packaging Machinery Co., Oakland, California.

EXAMPLES 9 AND 10

0.25 mil thick oriented polyvinyl chloride film was treated on both sides with a titanium acetyl acetonate solution substantially as described in Examples 1–8. The concentration of titanium was calculated to be 0.0225% by weight on each side of the film. As described in the previous examples, one side of the treated film was coated with a 0.25 mil layer of polyethylene. Samples of this film were tested for heat sealability and runability on conventional package making and bag fabricating equipment.

Heat seal strengths as measured in a Suter tester were as follows:

a. Coated side to coated side (120° C.)—500–1,000 g./inch.
b. Coated side to uncoated side (at 130° C.)—375 g./inch.

Bags fabricated in conventional make and fill bag machines showed that adequate side seam seals of the uncoated to coated side were possible using the film prepared as described above.

EXAMPLE 11

0.5 mil thick oriented polyethylene terephthalate films prepared as described above were treated on both sides with a tetrabutyl titanate solution comprising 2% by weight of the ester and 98% by weight of hexane. The solvent was removed in a conventional coating drying tower. The treated film was then coated on one side with a 0.25 mil layer of polyethylene, essentially as described in Examples 1–4. The one-side coated film possessed satisfactory heat sealability and runability on conventional package making and bag fabricating equipment.

EXAMPLE 12

Example 11 was repeated with the exception that the titanium organic compound utilized was a composition comprising 4% by weight tetraisopropyltitanate, 1% tetrastearyltitanate and 95% hexane. The one-side coated film thus prepared exhibited satisfactory heat sealability and runability on conventional package making and bag fabricating equipment.

The one-side coated films of the present invention satisfy the long existing need in the packaging industry for a durable packaging film which is both readily heat sealable and which gives good performance on conventional mechanical packaging equipment. These highly versatile films are readily applicable to a wide variety of packaging uses such as overwraps (tray wraps, carton wraps, bundling), make and fill bags and pouches, contour bottom bags, etc. The outstanding feature of these films is their ability to be utilized on conventional packaging equipment without the occurrence of such performance problems as excessive drag of sticking to heated surfaces used for sealing, thereby giving packaged units of good appearance and acceptable seal strength.

The one-side coated films of the present invention also find great use in many electrical applications such as, tape cables, binders, insulation protectors, plasticizer barriers, moisture-barrier impregnant dams, primary insulation, and helically or longitudinally wrapped wire and cable.

A particularly important electrical use for the films of the present invention is in the form of tapes for primary or secondary insulation in wire and cable wrapping. The films of the present invention when employed for this purpose enjoy the following two important advantages over materials presently employed:

(1) The polyethylene coating on the polyethylene terephthalate base film acts as a non-slip coating i.e. the strips do not readily slip loose from each other during winding.

(2) By wrapping the coated film of the present invention under certain temperature conditions, the polyethylene coated side will seal itself to the uncoated (polyethylene terephthalate) side. A moisture-proof wrapping is obtained thereby.

Pigments may also be added to the polyethylene coating, thus forming tapes or strips of different coloration. The pigmented film may also be printed, e.g., a white printed number on a black pigmented background. This feature finds great use in the electrical industry for identification purposes.

I claim:

1. A process for producing heat sealable organic film which comprises applying to both sides of a non-heat sealable organic base film a continuous coating of a solution of titanium organic compound from the group consisting of hydrolyzable organic titanium esters of the formula $(RO)_4Ti$ wherein R is an alkyl radical containing from 1 to 8 carbon atoms, and the reaction products obtained by reacting from 1 to 4 mols of acetylacetone with one mol of an alkyl titanate containing from 2 to 4 carbon atoms in the alkyl group, drying the coated film to remove the solvent and to cure the coating thereon, and thereafter applying to one side only of said coated film a continuous coating of a heat sealable coating composition consisting essentially of a solid polymer of an alpha-olefin.

2. The process of claim 1 wherein said base film is oriented polyethylene terephthalate film.

3. A process for producing heat sealable organic film which comprises applying to both sides of a non-heat sealable organic base film a continuous coating of an aqueous solution of a reaction product obtained by reacting from 1 to 4 mols of acetylacetone with one mol of an alkyl titanate containing from 2 to 4 carbon atoms in the alkyl group, drying the coated film to remove the solvent and to cure the coating thereon, and thereafter applying to one side only of said coated film a continuous coating of a heat sealable coating composition consisting essentially of a solid polymer of an alpha-olefin.

4. The process of claim 3 wherein said base film is oriented polyethylene terephthalate film.

5. A process which comprises applying to both sides of polyethylene terephthalate film a continuous coating of a solution of titanium organic compound from the group consisting of hydrolyzable organic titanium esters of the formula $(RO)_4Ti$ wherein R is an alkyl radical containing from 1 to 8 carbon atoms, and the reaction products obtained by reacting from 1 to 4 mols of acetylacetone with one mol of an alkyl titanate containing from 2 to 4 carbon atoms in the alkyl group, drying the coated film to remove the solvent and to cure the coating thereon, and thereafter applying to one side only of said coated film a continuous coating of polyethylene.

6. The process of claim 5 wherein the titanium organic compound is a reaction product obtained by reacting from 1 to 4 mols of acetylacetone with one mol of an alkyl titanate containing from 2 to 4 carbon atoms in the alkyl group.

7. A heat-sealable film comprising a non-heat sealable base film having on both sides a continuous coating of a hydrolyzed titanium organic compound from the group consisting of hydrolyzable organic titanium esters of the formula $(RO)_4Ti$ wherein R is an alkyl radical containing from 1 to 8 carbon atoms, and the reaction products obtained by reacting from 1 to 4 mols of acetylacetone with one mol of an alkyl titanate containing from 2 to 4 carbon atoms in the alkyl group, and having on one side only a continuous top coating of a heat sealable coating consisting essentially of a solid polymer of an alpha-olefin.

8. A heat sealable film comprising oriented polyethylene terephthalate film having on both sides a continuous coating of a hydrolyzed titanium organic compound from the group consisting of hydrolyzable organic titanium esters of the formula $(RO)_4Ti$ wherein R is an alkyl radical containing from 1 to 8 carbon atoms, and the reaction products obtained by reacting from 1 to 4 mols of acetylacetone with one mol of an alkyl titanate containing from 2 to 4 carbon atoms in the alkyl group, and having on one side only a continuous top coating of a heat sealable coating consisting essentially of a solid polymer of an alpha-olefin.

9. A heat sealable film comprising oriented polyethylene terephthalate film having on both sides a continuous coating of a hydrolyzed reaction product obtained by reacting from 1 to 4 mols of acetylacetone with one mol of an alkyl titanate containing from 2 to 4 carbon atoms in the alkyl group, and having on one side only a continuous top coating of a heat sealable coating consisting essentially of a solid polymer of an alpha-olefin.

10. A heat sealable film comprising oriented polyethylene terephthalate film having on both sides a continuous coating of a hydrolyzed reaction product obtained by reacting from 1 to 4 mols of acetylacetone with one mol of an alkyl titanate containing from 2 to 4 carbon atoms in the alkyl group, and having on one side only a top coating of polyethylene.

11. A heat sealable film comprising a base film of polyethylene terephthalate having on one surface thereof a continuous coating of a copolymer of vinylidene chloride, acrylonitrile and itaconic acid in the weight ratio of 90/10/1 respectively; a continuous coating of a hydrolyzed reaction product obtained by reacting from 1 to 4 mols of acetylacetone with one mol of an alkyl titanate containing from 2 to 4 carbon atoms in the alkyl group on the uncoated surface and on the copolymer coated surface of said base sheet, and a continuous top coating of polyethylene on the copolymer coated surface of said base film.

References Cited in the file of this patent

UNITED STATES PATENTS

| | | |
|---|---|---|
| 2,680,108 | Schmidt | June 1, 1954 |
| 2,726,171 | Morf | Dec. 6, 1955 |
| 2,751,314 | Keil | June 19, 1956 |
| 2,768,909 | Haslam | Oct. 30, 1956 |
| 2,779,684 | Alles | Jan. 29, 1957 |
| 2,824,025 | McIntyre | Feb. 18, 1958 |
| 2,888,367 | Greyson | May 26, 1959 |
| 2,898,229 | Herr et al. | Aug. 4, 1959 |
| 2,911,321 | Herrmann et al. | Nov. 3, 1959 |
| 2,927,865 | Lewis et al. | Mar. 8, 1960 |
| 2,984,641 | Wolinski | May 16, 1961 |
| 2,992,133 | Zehring | July 11, 1961 |